(12) United States Patent
Wang et al.

(10) Patent No.: US 11,379,314 B2
(45) Date of Patent: Jul. 5, 2022

(54) METHOD, DEVICE, AND COMPUTER PROGRAM PRODUCT FOR MANAGING BACKUP TASK

(71) Applicant: EMC IP Holding Company LLC, Hopkinton, MA (US)

(72) Inventors: Yi Wang, Chengdu (CN); Qingxiao Zheng, Chengdu (CN); Lanjun Liao, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 234 days.

(21) Appl. No.: 16/794,484

(22) Filed: Feb. 19, 2020

(65) Prior Publication Data

US 2020/0387429 A1    Dec. 10, 2020

(30) Foreign Application Priority Data

Jun. 10, 2019 (CN) .......................... 201910495857.8

(51) Int. Cl.
*G06F 11/14* (2006.01)
*G06F 16/17* (2019.01)
*G06F 16/14* (2019.01)

(52) U.S. Cl.
CPC ...... *G06F 11/1464* (2013.01); *G06F 11/1451* (2013.01); *G06F 11/1461* (2013.01); *G06F 11/1469* (2013.01); *G06F 16/156* (2019.01); *G06F 16/1734* (2019.01)

(58) Field of Classification Search
CPC ............. G06F 11/1464; G06F 11/1451; G06F 11/1461; G06F 11/1469; G06F 16/156; G06F 16/1734; G06F 11/1448; G06F 3/0614; G06F 3/0644; G06F 3/0656
USPC ........................................................ 714/4.11
See application file for complete search history.

(56) References Cited

U.S. PATENT DOCUMENTS

| | | | |
|---|---|---|---|
| 2011/0202735 A1* | 8/2011 | Kono .................. | G06F 11/1458 711/E12.103 |
| 2012/0233419 A1* | 9/2012 | Yamashita .......... | G06F 11/1461 711/162 |
| 2017/0091045 A1* | 3/2017 | Bangalore ........... | G06F 11/1461 |

* cited by examiner

*Primary Examiner* — Yair Leibovich
(74) *Attorney, Agent, or Firm* — Chamberlain, Hrdlicka, White, Williams & Aughtry (57) ABSTRACT

The present disclosure relates to a method, device and computer program product for managing a backup job. Specifically, there is provided a method for managing a backup job, the backup job being used to store a data object to a storage system. In the method, the difference between the data object specified by the backup job and a copy of the data object in the storage system is determined. In response to determining the difference meets a predetermined threshold, a difference area in the data object where there might exist the difference is determined. With respect to a first block within the difference area, in a group of blocks in the data object, the backup job is processed based on a first query result from the storage system, the first query result indicating whether data in the first block differs from data in a corresponding block in the copy.

18 Claims, 9 Drawing Sheets

METHOD, DEVICE, AND COMPUTER PROGRAM PRODUCT FOR MANAGING BACKUP TASK

CROSS-REFERENCE TO RELATED APPLICATIONS

This application claims benefit to Chinese Patent Application 201910495857.8 filed on Jun. 10, 2019. Chinese Patent Application 201910495857.8 is hereby incorporated by reference in its entirety.

FIELD

Various implementations of the present disclosure generally relate to backup jobs, and more specifically, to a method, device and computer program product for managing a backup job of storing a data object to a storage system.

BACKGROUND

With the development of data storage technologies, a storage system can perform backup operations to various types of data objects. For example, a user may periodically store specified data objects in the storage system. A data object might require storage space of gigabytes and even more depending on its type. It will take great bandwidths and time to transmit these to-be-backed up data to the storage system. At this point, how to improve the performance in executing a backup job becomes a focus of research.

SUMMARY

Therefore, it is desirable to develop and implement a technical solution for managing a backup job more effectively. It is desired that the technical solution is compatible with an existing storage system and can manage a backup job in the storage system more effectively by reconstructing various configurations of the existing storage system.

According to a first aspect of the present disclosure, there is provided a method for managing a backup job, the backup job being used to store a data object to a storage system. In the method, the difference between the data object specified by the backup job and a copy of the data object in the storage system is determined. In response to determining that the difference meets a predetermined threshold, a difference area in the data object where there might exist the difference is determined. With respect to a first block within the difference area, in a group of blocks in the data object, the backup job is processed based on a first query result from the storage system, the first query result indicating whether data in the first block differs from data in a corresponding block in the copy.

According to a second aspect of the present disclosure, there is provided a device for managing a backup job, the backup job being used to store a data object to a storage system. The device comprises: at least one processor; a volatile memory; and a memory coupled to the at least one processor, the memory having instructions stored thereon, the instructions, when executed by the at least one processor, causing the device to perform a method. The method includes: determining the difference between the data object specified by the backup job and a copy of the data object in the storage system; in response to determining the difference meets a predetermined threshold, determining a difference area in the data object where there might exist the difference; with respect to a first block within the difference area, in a group of blocks in the data object, processing the backup job based on a first query result from the storage system, the first query result indicating whether data in the first block differs from data in a corresponding block in the copy.

According to a third aspect of the present disclosure, there is provided a computer program product. The computer program product is tangibly stored on a non-transient computer readable medium and comprises machine executable instructions which are used to implement a method according to the first aspect of the present disclosure.

BRIEF DESCRIPTION OF THE DRAWINGS

Through the more detailed description in the accompanying drawings, features, advantages and other aspects of the implementations of the present disclosure will become more apparent. Several implementations of the present disclosure are illustrated schematically and are not intended to limit the present invention. In the drawings.

DETAILED DESCRIPTION OF IMPLEMENTATIONS

The preferred implementations of the present disclosure will be described in more details with reference to the drawings. Although the drawings illustrate the preferred implementations of the present disclosure, it should be appreciated that the present disclosure can be implemented in various manners and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can comprise other explicit and implicit definitions.

Figure 1:
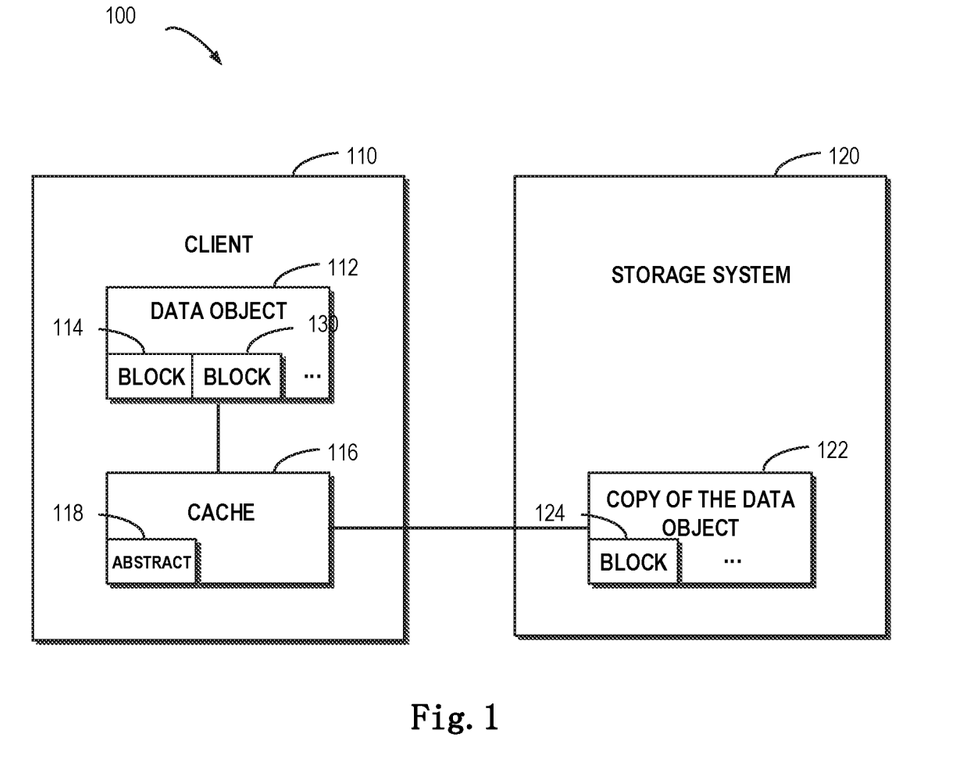
FIG. 1 illustrates a schematic view of a working environment in which example implementations of the present disclosure may be implemented.

FIG. 1 shows a schematic view of a working environment 100 in which example implementations of the present disclosure may be implemented. As depicted, the working environment 100 may comprise a client 110 and a storage system 120, where the client 110 may store a data object 112 in the storage system 120. It will be understood as time elapses, the data object 112 may be changed. In order to store each version of the data object 112 at each time point, various copies of the data object 112 may be stored in the storage system 120 at different time points. The data object 112 may have different sizes. In order to facilitate management, the data object 112 may be divided into multiple blocks. For example, the block size may be specified, and the data object 112 may be divided into blocks 114, 130 and other blocks in the specified size.

A copy 122 of the data object 112 may be stored to the storage system 120 by the unit of blocks. While performing a backup operation, only changed blocks since the last backup may be stored to the storage system 120. For example, since the last backup, if data in the block 114 is changed, then the data in the block 114 may be stored to the storage system 120; if data in the block 114 is not changed, then the storage system 120 may continue to use data in a corresponding block in the copy 122 of the data object 112 to form a new copy. For the sake of description, the copy 122 of the data object 112 is abbreviated as a copy below.

In order to make it easy to determine whether data in various blocks in the data object 112 is changed or not, a cache 116 may be provided at the client 110, and abstracts of various blocks in the copy 122 may be loaded to the cache 116. For example, consider a scenario in which data in the block 114 is stored to a block 124 in the copy 122, and then an abstract may be generated (e.g. based on a hash algorithm or other implementation) for data in the block 124 and loaded into the cache 116 for the purpose of forming an abstract 118.

While performing backup, first an abstract may be generated based on data in the block 114, and then the generated abstract may be compared with the abstract 118 to see whether or not they match; if they match, then it is determined data in the block 114 is not changed. At this point, data in the block 114 may not be transmitted to the storage system 120. If not, data in the block 114 is transmitted to the storage system 120. Although the speed of determining consistency between the data object 112 and the copy 122 may be accelerated based on the cache 116, when many blocks in the data object 112 are changed, abstracts in the cache 116 need to be queried and compared frequently. If the cache 116 does not include an abstract of a block in the copy 122 which corresponds to the block 130, a cache miss occurs. At this point, the storage system 120 needs to be further queries so as to determine whether data in the block 130 is changed or not.

It will be understood although FIG. 1 schematically shows one client 110, there may exist more clients and more backup jobs in the working environment 100. In this case, to query the cache 116 and perform comparisons the system may utilize large amounts of computing overhead and time. Therefore, it is desirable to develop a more effective technical solution for managing backup jobs.

Embodiments of the present disclosure provide a method, device and computer program product for managing backup jobs. According to example implementations of the present disclosure, the concept of difference area is introduced. The difference area here refers to a part of storage space inside the data object 112, and it is highly possible that data in the storage space is changed since the last backup. In this implementation, processing may be performed to each of multiple blocks in the data object 112. If a block is in the difference area, then the cache 116 may be bypassed, and the storage system 120 is directly queried to determine whether data in the block is consistent with data in a corresponding block in a previous copy.

Figure 2:
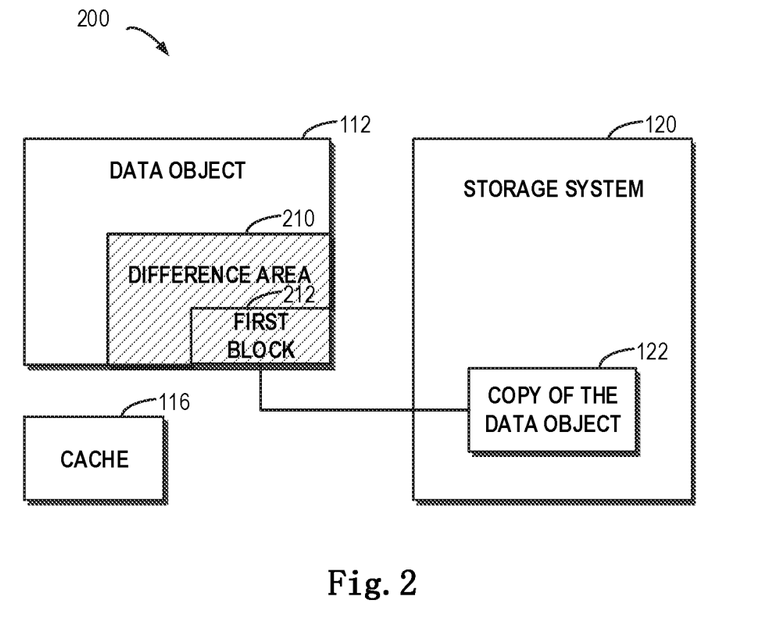
FIG. 2 schematically illustrates a block diagram of the process for managing a backup job according to example implementations of the present disclosure.

With reference to FIG. 2, a general description is presented below to principles of the present disclosure. FIG. 2 schematically shows a block diagram 200 of the process for managing backup jobs according to example implementations of the present disclosure. As depicted, a difference area 210 may comprise a part of address range in the data object 112, and it is highly possible that data in the difference area 210 has been changed. Here the difference area 210 may be determined based on historical experience. At this point, when there is a need to determine whether a first block 212 within the difference area 210 has been changed or not, the storage system 120 may be directly queried instead of the cache 116 being queried first.

It will be understood if the first block 212 is within the difference area 210, then it is highly probable that data in the first block 212 is changed. Even if the cache 116 is queried, the query result might indicate data in the first block 212 has been changed. At this point, the storage system 120 needs to be further queried, and the step of querying the cache 116 becomes useless and thus may be skipped. With example implementations of the present disclosure, the storage system 120 may be directly queried about relevant information of data in a block which might have been changed (i.e. information of a block within the difference area 210). In this way, various overheads for useless operations may be reduced, a query result may be directly obtained from the storage system 120, and further the overall performance of backup jobs may be improved.

Figure 3:
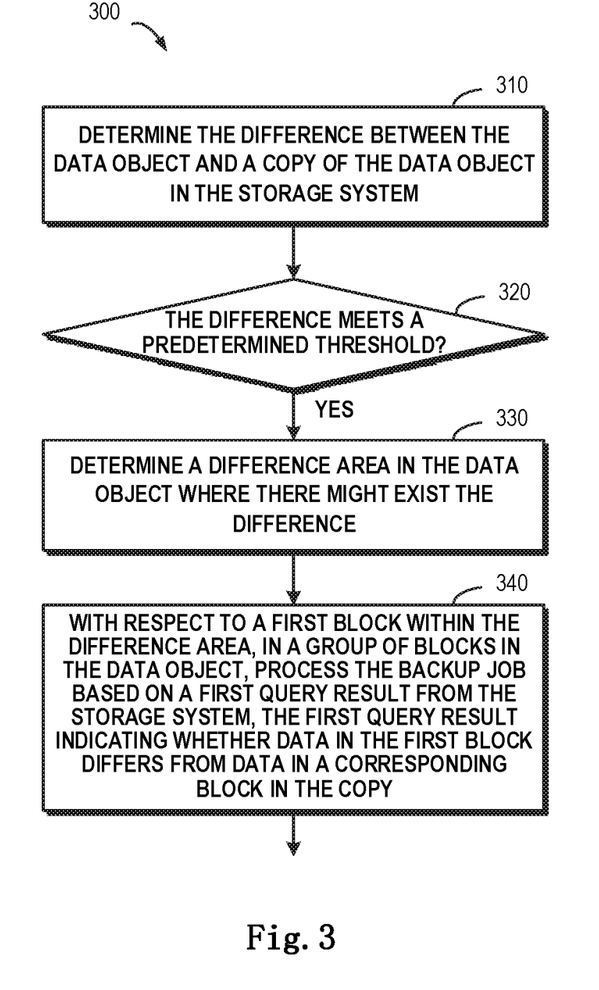
FIG. 3 schematically illustrates a flowchart of a method for managing a backup job according to example implementations of the present disclosure.

With reference to FIG. 3, description is presented below to more details about example implementations of the present disclosure. Specifically, FIG. 3 schematically shows a flowchart of a method 300 for managing backup jobs according to example implementations of the present disclosure. The method 300 involves managing a backup job of storing the data object 112 to the storage system 120. The backup job may be triggered based on various factors, for example, the backup job may be performed periodically, or the backup job may be triggered by an owner, user, administrator or hypervisor of the data object 112.

As shown in FIG. 3, at block 310, the difference between the data object 112 specified by the backup job and the copy 122 of the data object 112 in the storage system 120 is determined. Here the difference may be represented as the total amount of changed data, and alternatively, the difference may further be represented as the number of changed blocks.

At block 320, it may be determined whether the difference satisfies a predetermined threshold. It will be understood where more data in the data object 112 is changed, the method 300 may greatly reduce extra overhead caused by querying the cache 116. Therefore, in the context of the present disclosure, before performing a new backup operation, it should be determined first whether changed data (i.e. difference) in the data object 112 reaches the predetermined threshold or not. It will be understood if only a small amount of data is changed (i.e., the predetermined threshold is not reached) since the last backup operation, then at this point, according to the method as shown in FIG. 1, it may be determined based on data in the cache 116 whether data in various blocks is changed or not.

According to example implementations of the present disclosure, the predetermined threshold may be represented in various ways. For example, the predetermined threshold may be represented as an absolute value. For example, the predetermined threshold may be set to 500 MB or other value. At this point, if the difference is higher than the predetermined threshold, then the method 300 proceeds to block 330. If the difference is lower than the predetermined threshold, then subsequent processing may be performed according to the method described with reference to FIG. 1. For another example, the predetermined threshold may further be represented as a relative value. If the ratio of the size of the difference to the size of the data object 112 (or the copy 122) reaches a predetermined ratio (e.g. 20% or another value), then the method 300 proceeds to block 330.

At block 330, a difference area 210 containing possible difference in the data object 112 is determined. The difference area 210 may be determined in various ways. For example, consider a scenario in which the data object 112 is a text object, and historical operations show the user continuously adding new content to the end of the text object, and then at this point the difference area 210 may be at the end of the data object 112. In another example, suppose the user has recently changed a certain chapter of the text object, then at this point the difference area 210 may involve a portion related to the chapter.

According to an example implementation of the present disclosure, the position of the difference area 210 may be determined based on historical data. For example, a difference mapping may be built for different data objects 112. Here the difference mapping may comprise a mapping relation between the copy 122 of the data object 112 and a changed area in the data object 112. In this implementation, the difference area 210 may be determined based on the mapping relation which is obtained from historical data training and recorded in the difference mapping. With example implementations of the present disclosure, a corresponding difference mapping may be built for each data object. Since modifications to each data object usually follows a similar change pattern, it is possible to accurately describe which areas in the data object 112 might be changed, based on the difference mapping built on multiple historical copies recording multiple historical changes.

Figure 4:
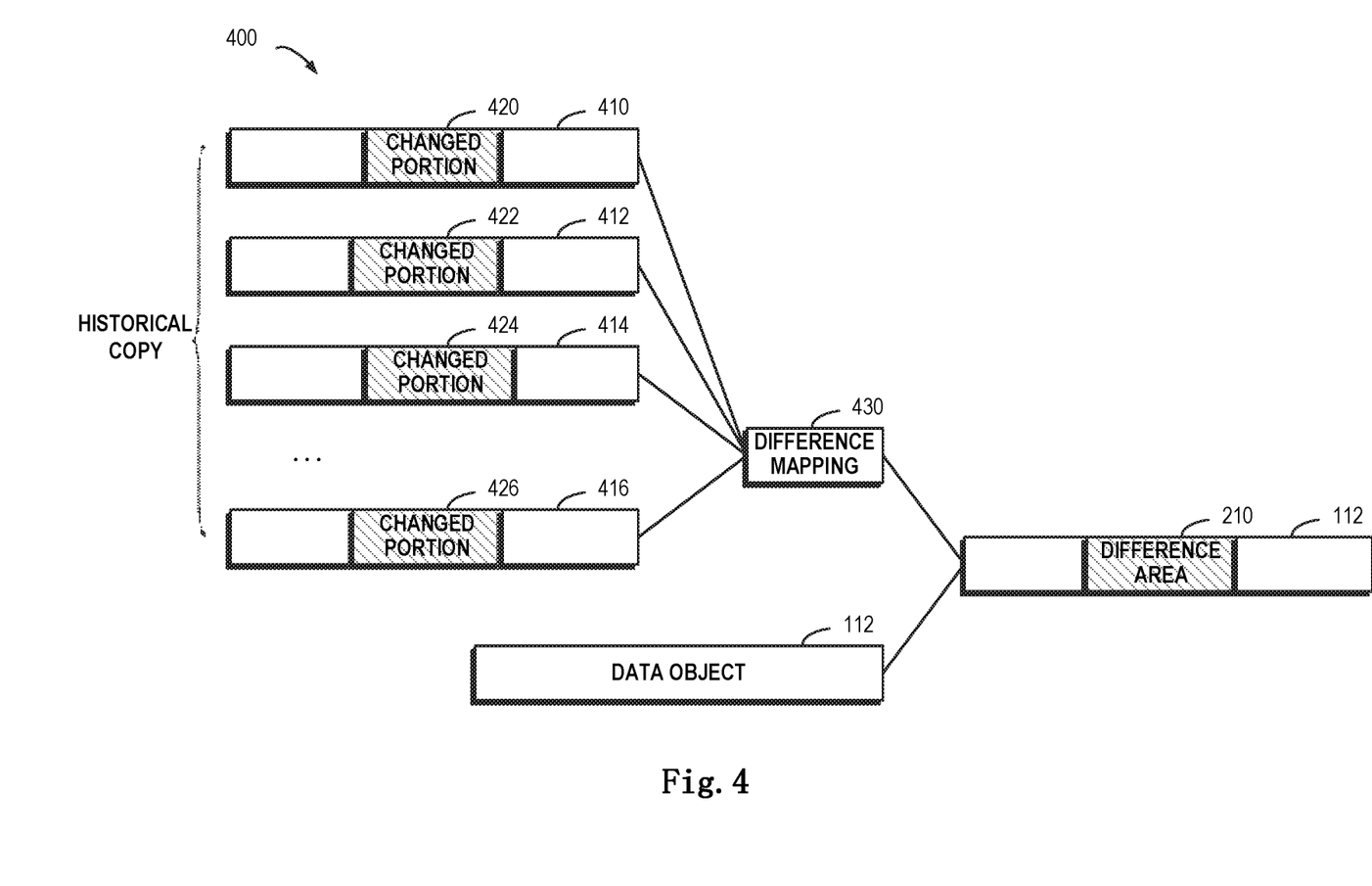
FIG. 4 schematically illustrates a block diagram of the process for building a difference mapping and determining a difference area based on the difference mapping according to example implementations of the present disclosure.

With reference to FIG. 4, description is presented below to more details on how to determine a difference mapping in one or more embodiments of the invention. FIG. 4 schematically shows a block diagram 400 of the process for building a difference mapping 430 and determining the difference area 210 based on the difference mapping 430 according to example implementations of the present disclosure. As depicted, multiple historical copies 410, 412, 414, . . . , and 416 of the data object 112 may be obtained separately. Here the historical copy refers to a copy which is generated during a previous backup operation. Suppose backup operations are performed every night, then 7 historical copies are generated in the past one week. The number of historical copies to be obtained may be specified, and the difference mapping 430 may be generated based on various historical copies.

Information of changed portions in the multiple historical copies 410, 412, 414, and 416 may be determined respectively. For example, a changed portion 420 in the historical copy 410, a changed portion 422 in the historical copy 412, a changed portion 424 in the historical copy 414, . . . , and a changed portion 426 in the historical copy 416 may be determined. Subsequently, the difference mapping 430 may be trained based on the multiple historical copies 410, 412, 414, . . . , and 416 and the relevant changed portions 420, 422, 424, . . . , and 426, so that the trained difference mapping 430 represents a mapping relation between the historical copy and the changed portion in the historical copy.

Having successfully obtained the difference mapping 430, the difference area 210 in the data object 112 may be determined based on the difference mapping. In other words, it may be determined data in which areas in the data object 112 might be changed. Suppose the historical copy shows the user constantly modifies the middle of the data object 112, then at this point the difference mapping 430 may obtain the user's modifying habit, so the determined difference area 210 will be at a middle position of the data object 112.

Figure 5:
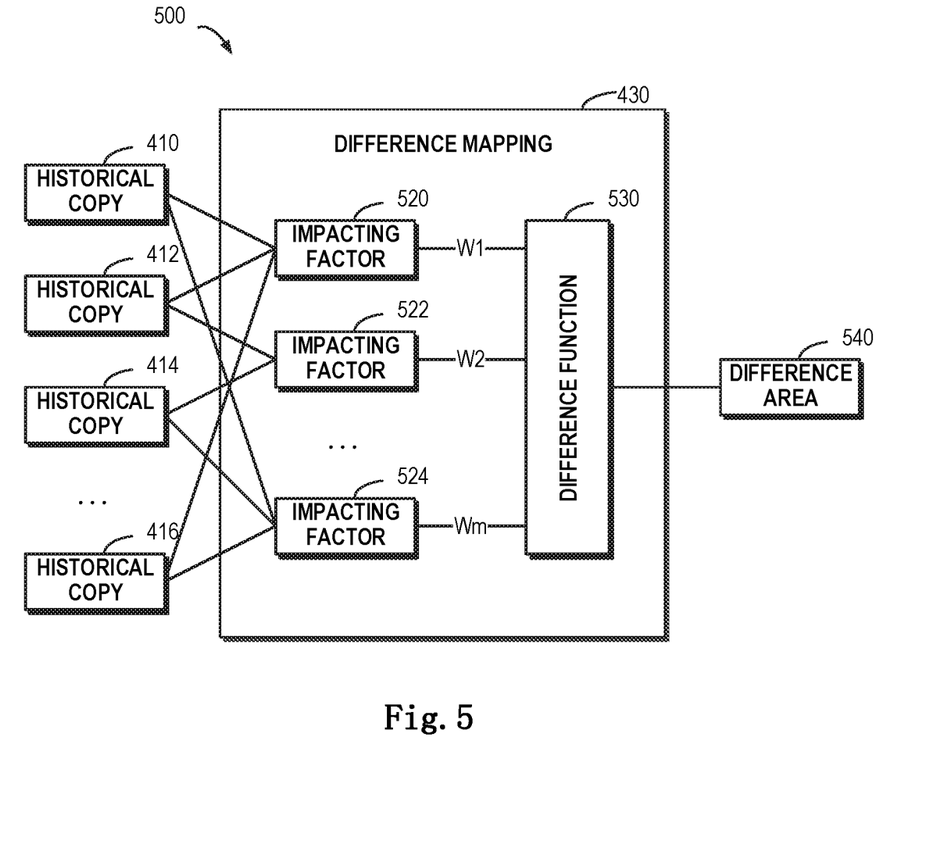
FIG. 5 schematically illustrates a block diagram of the process for building a difference mapping according to example implementations of the present disclosure.

According to example implementations of the present disclosure, the difference mapping 430 may be determined based on multiple impacting factors. With example implementations of the present disclosure, various features of the changed portion in the past period may be taken into full consideration, and further the difference mapping 430 may be caused to fully reflect multiple aspects of historical changes. With reference to FIG. 5, description is presented below to more details on how to determine the difference mapping 430.

FIG. 5 schematically shows a block diagram 500 of the process for building the difference mapping 430 according to example implementations of the present disclosure. As depicted, multiple historical copies 410, 412, 414, . . . , and 416 may be obtained. For example, regarding a given historical copy among the multiple historical copies, one impacting factor may relate to an address of a changed block in the given historical copy. According to example implementations of the present disclosure, the address of the changed block may be represented as an identifier of the block or an address of the block in the data object 112.

Suppose blocks in the data object 112 are represented as block-0, block-1, . . . block-N, if the first two blocks are modified, then at this point the address may be represented as (block-0, block-1). According to example implementations of the present disclosure, the address may be represented as a physical address/logical address of the changed block. Suppose a physical address of block-0 is (0x0000 . . . 00, 0x0fff . . . ff), and a physical address of block-1 is (0x000 . . . 00, 0x1fff . . . ff), then the address of the changed block may be represented as (0x000 . . . 00, 0x0fff . . . ff, 0x1000 . . . 00, 0x1fff . . . ff). According to example implementations of the present disclosure, the address of changed data may be determined with finer data granularity.

For another example, one impacting factor may relate to the number of times that a changed block in the given historical copy has been changed. Suppose block-0 is changed 6 times in past 7 historical copies, then at this point the number of times that block-0 has been changed may be set to 6. For another example, one impacting factor may relate to the number of successive changes of a changed block in the given historical copy. Continuing the above example, suppose 5 out of 6 changes of block-0 are successive, then at this point the number of successive changes of block-0 may be set to 5.

For another example, the historical distribution that a certain block is changed may be described in a vector form. Suppose training is based on M previous historical copies, then the historical distribution of changes may be described as an M-dimensional vector. Specifically, suppose 7 historical copies in the last week (from Monday to Sunday) are collected for training, then at this point the change history may be described with a vector comprising 7 dimensions. For example, the vector (1, 1, 0, 0, 0, 0, 0) represents the data object 112 is changed on Monday and Tuesday and remains unchanged from Wednesday to Sunday. A further number of historical copies may be selected. For example, when 5 historical copies are selected, then the historical distribution that the data object 112 is changed may be described with a vector comprising 5 dimensions.

Information related to the changed portion may be stored in a vector form. According to example implementations of the present disclosure, multiple impacting factors 520, 522, ... and 524 may be set. Each impacting factor may represent the impact of a corresponding attribute on one aspect of the difference mapping 430, and a corresponding weight may be set for each impacting factor. For example, a weight W1 may be set for the impacting factor 520, W2 for 522, ..., and Wm for 524.

A difference function 530 may be constructed based on machine learning technology. It is desired the difference function 530 may describe associations between the multiple historical versions 410, 412, 414, ..., and 416 and the corresponding changed portions 420, 422, 424, ..., and 426. After training the difference mapping 430 based on historical sample data, when the multiple historical versions 410, 412, 414, ..., and 416 are inputted to the difference mapping 430 separately, the difference area 210 determined through the difference mapping 430 is consistent with the collected changed portions 420, 422, 424, ..., and 426 as much as possible.

For example, suppose an impacting factor (wherein $x_i$ represents the $i^{th}$ impacting factor) and a corresponding weight (wherein w represents a weight of the $i^{th}$ impacting factor) are represented using Formula 1 and Formula 2 respectively, wherein the integer m represents the number of impacting factors. At this point, the vector $X^T$ represents a group of impacting factors, and the vector $W^T$ represents corresponding weights.

$$X^T = [X_1 x_2 \ldots x_m] \quad \text{Formula 1}$$

$$W^T = [w_1 w_2 \ldots w^M] \quad \text{Formula 2}$$

The difference function 530 may be represented using Formula 3 below, wherein z represents a difference function, and b represents a constant.

$$z = b + w_1 \times x_1 + w_2 \times x_2 + \ldots + w_m \times x_m = b + \Sigma_{k=1}^{m} w_k \times x_k \quad \text{Formula 3}$$

The Sigmoid function shown by Formula 4 below may be used as an activation function of the difference mapping 430. Regarding the $i^{th}$ impacting factor among impacting factors, Formula 5 may be obtained as below.

$$f(z) = \frac{1}{1+e^{-z}} = \frac{1}{1+e^{(-b-\Sigma_{k=1}^{m} w_k \times x_k)}} \quad \text{Formula 4}$$

$$f(z(i)) = \frac{1}{1+e^{-z(i)}} = \frac{1}{1+e^{(-b-\Sigma_{k=1}^{m} w_k(i) \times x_k(i))}} \quad \text{Formula 5}$$

The difference between the changed area in the collected historical copy and the changed area determined based on the difference mapping 430 may be represented using Formula 6, and further a cost function may be constructed as shown by Formula 7 below:

$$e(z(i)) = d(z(i)) - f(z(i)) \quad \text{Formula 6}$$

$$E(W) = \frac{1}{2}\Sigma_{i=1}^{N} e^2(z(i)) = \frac{1}{2}\Sigma_{i=1}^{N}(d(z(i)) - f(z(i)))^2 \quad \text{Formula 7}$$

By deriving Formula 7, Formula 8 may be obtained below:

$$g = \frac{\partial E(W)}{\partial W} \quad \text{Formula 8}$$

$$= \frac{\partial}{\partial W}\left(\frac{1}{2}\sum_{i=1}^{N}(d(z(i)) - f(z(i)))^2\right)$$

$$= -\sum_{i=1}^{N} e(z(i))f(z(i))(1 - f(z(i)))$$

Based on the partial derivatives, the step length n may be set and the value for next training may be obtained based on Formula 9.

$$W(i+1) = W(i) - ng(i) = W(i) + n\Sigma_{i=1}^{N} e(z(i))f(z(i))(1-f(z(i))) \quad \text{Formula 9}$$

With the collected historical sample data, the difference mapping 430 is iteratively trained based on the above described formulas, until the cost function E(W) satisfies a predetermined condition. It will be understood principles involved in training the difference mapping 430 have been described in brief with reference to Formulas 1 to 9. In the context of the present disclosure, it is not intended to limit in which manner the difference mapping 430 is trained, but the difference mapping 430 may be obtained based on training technologies which have been developed and/or are to be developed in future.

Figure 6:
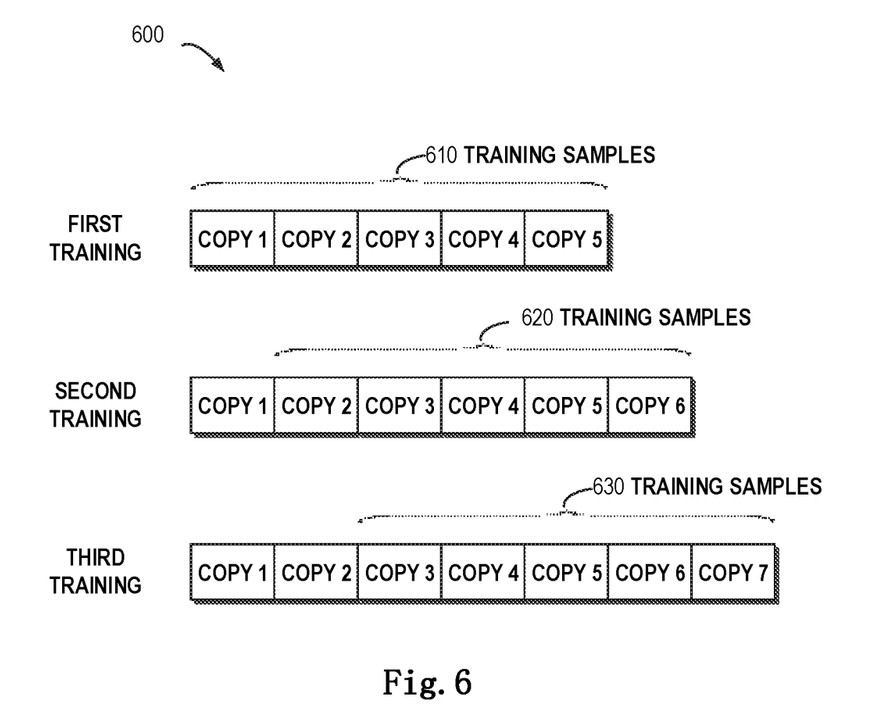
FIG. 6 schematically illustrates a block diagram of the process for selecting historical copies according to example implementations of the present disclosure.

FIG. 6 schematically shows a block diagram 600 of the process for selecting historical copies according to example implementations of the present disclosure. Training may be iteratively performed for times, so as to obtain the difference mapping 430. In each training, relatively new copies may be selected as training data. Suppose 5 historical copies are selected as training samples. As shown in FIG. 6, copies 1-5 may be selected as a training sample 610 in the first training. As time elapses, a copy 6 may be obtained. Then, in the second training, copies 2-6 may be selected as a training sample 620. Later, a copy 7 may be obtained, and then in the third training, copies 3-7 may be selected as a training sample 630, and so on and so forth.

With example implementations of the present disclosure, latest copies may be selected as training data continuously. In this way, potential problems in the difference mapping 430 may be corrected based on the user's latest habits of changing the data object 112, and further the difference area 210 resulting from the difference mapping 430 is made as much consistent as the actual changed area.

Returning to FIG. 3, at block 340, the backup job may be processed based on a first query result from the storage system 120 with respect to a first block within the difference area, in a group of blocks in the data object. The first query result here indicates whether there is difference between data in the first block and data in a corresponding block in the copy.

According to example implementations of the present disclosure, if the first query result indicates there is difference, this means data in a block, corresponding to the first block 212, in the copy at the storage system 120 is out of date. Therefore, data in the first block 212 needs to be sent to the storage system 120 so as to generate a new copy. Subsequently, a message may be sent to the storage system 120 so as to instruct the storage system 120 to generate a portion, corresponding to the first block 212, in the new copy of the data object 112 based on received data.

According to example implementations of the present disclosure, if the first query result indicates there is no difference, this means data in a block, corresponding to the first block 212, in the copy 122 at the storage system 120 is not changed and still valid. Therefore, there is no need to send data in the first block 212 to the storage system 120. Subsequently, a message may be sent to the storage system 120 so as to indicate to the storage system 120: a portion in the current copy 122 which corresponds to the first block 212 is still the valid latest version, so a new copy may be generated directly based on the portion in the copy 122 which corresponds to the first block 212.

According to example implementations of the present disclosure, a first query request may be sent to the storage system 120 so as to query whether there is difference between data in the first block 212 and data in a corresponding block in the copy 122. The first query request may be implemented in various ways. For example, a first abstract of data in the block 212 may be determined and then sent to the storage system 120 for comparison.

The storage system 120 may determine an abstract of the portion in the copy 122 which corresponds to the first block 212. At the storage system 120, it may be determined by comparing the first abstract with the determined abstract whether data in the first block 212 is changed or not. For example, if the two abstracts match each other, then a first query result is returned to the client 110, indicating data in the first block 212 is not changed. If the two abstracts do not match, then a first query result is returned to the client 110, indicating data in the first block 212 is changed. The client 110 may receive the first query result returned from the storage system 120 with respect to the first query request.

It will be understood although a processing method only with respect to the first block 212 in the difference area 210 has been described above, according to example implementations of the present disclosure, the above method 300 may be performed to various blocks in the data object 112. For example, multiple blocks may be processed in parallel, in series or partly in parallel and partly in series.

Figure 7:
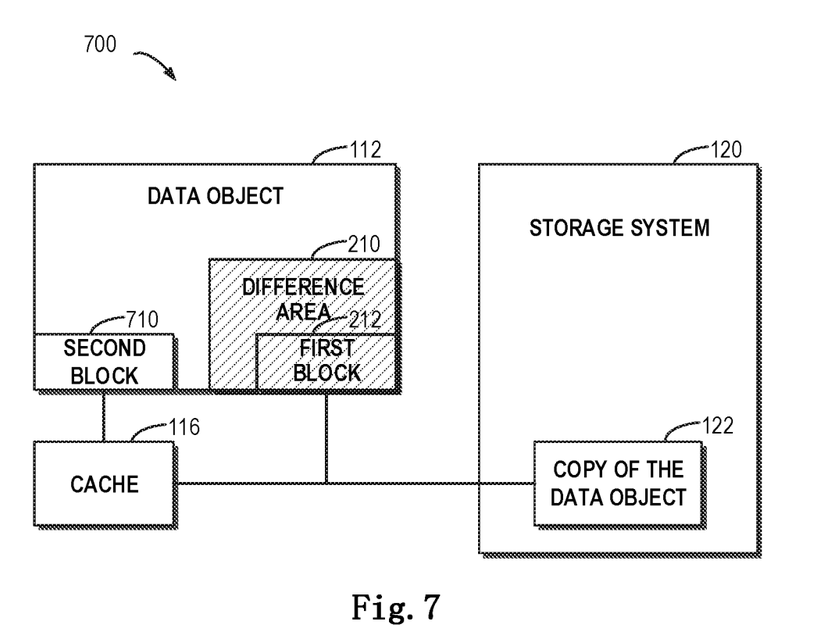
FIG. 7 schematically illustrates a block diagram for performing processing with respect to a block outside the difference area according to example implementations of the present disclosure.

Description has been presented regarding how to process blocks within the difference area 210. With reference to FIG. 7, description is presented below regarding how to process blocks outside the difference area 210. According to example implementations of the present disclosure, the method 300 may be implemented at the client 110 for accessing the storage system 120, at which point a query may be made based on the cache 116 at the client 110. Hereinafter, more details about example implementations of the present disclosure will be described with reference to FIG. 7.

FIG. 7 schematically shows a block diagram 700 for processing blocks outside the difference area 210 according to example implementations of the present disclosure. In the implementations, with respect to a second block 710 outside the difference area 210 in the group of blocks, a backup job may be processed based on a second query result from the cache 116 at the client 110. Here, the second query result indicates whether there is difference between data in the second block 710 and data in a corresponding block in a copy.

According to example implementations of the present disclosure, abstracts of at least one portion of blocks in a group of blocks in the copy 122 may be loaded to the cache 116. Suppose the data object 112 comprises N blocks, then at this point the copy 122 has blocks corresponding to the N blocks respectively. That is, a group of blocks in the copy correspond to a group of blocks in the data object 112. An abstract corresponding to each block in the copy 122 may be generated. It will be understood as the storage space in the cache 116 is limited, abstracts in the cache 116 may be updated based on the Least Recently Used principle or other.

It will be understood when querying the cache 116, a cache hit or a cache miss might arise. If an abstract of data in the second block 710 matches a certain abstract in the cache 116, then at this point the cache 210 is hit, and it may be determined data in the second block 710 is not changed. Therefore, the second query result may be set as there being no difference. There may further exist a case in which the cache 116 has an abstract of a block corresponding to the second block 710 whereas the abstract does not match the abstract of data in the second block 710. At this point, it may be determined data in the second block 710 is changed, so the second query result may be set as there being difference.

It will be understood there may also exist a case in which the cache 116 has no abstract corresponding to the second block 710 and, thus, the storage system 120 is queried. Specifically, if it is determined that the cache 116 has no abstract of a block corresponding to the second block 710 (at this point the cache 116 is missed), then a second query request is sent to the storage system 120 so as to query whether there is difference between data in the second block 116 and data in a corresponding block in a copy of the data object 112.

Figure 8:
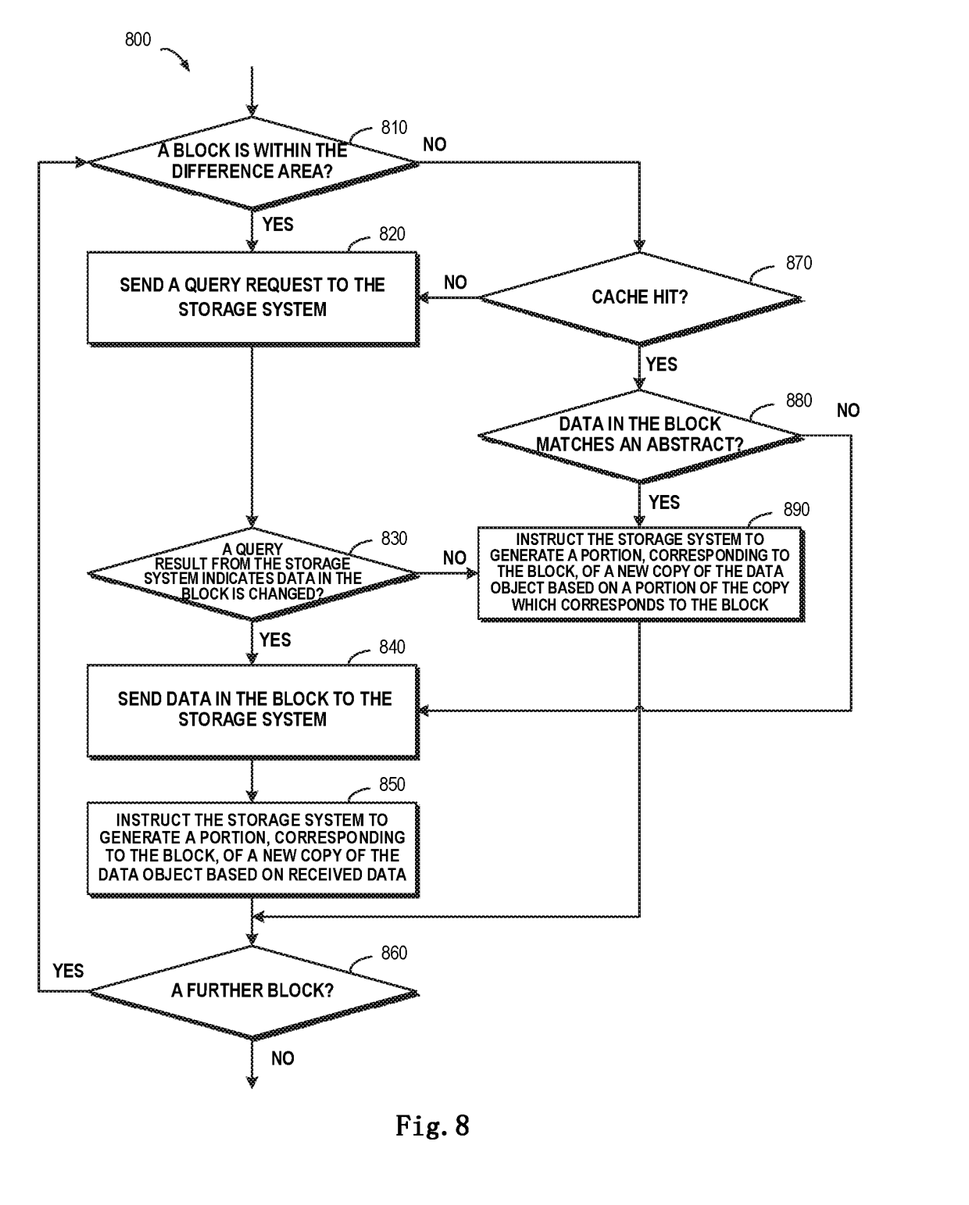
FIG. 8 schematically illustrates a flowchart of a method for processing a block in a data object according to example implementations of the present disclosure.

With reference to FIG. 8, description is presented below to more details about the flow of processing blocks in the data object 112. FIG. 8 schematically shows a flowchart of a method 800 for processing blocks in the data object 112 according to example implementations of the present disclosure. The method 800 as shown in FIG. 8 may be performed to various blocks in the data object 112. For example, blocks may be processed sequentially, in parallel, or in series combined with in parallel.

In FIG. 8, at block 810, first it may be determined whether a block is within the difference area 210 or not. If the result of the determination is "yes," then the method 800 proceeds to block 820 so as to send a query request to the storage system 120. At block 830, if a query result from the storage system 120 indicates data in the block is changed, then the method 800 proceeds to block 840. If the query result indicates data in the block is not changed, then the method 800 proceeds to block 890 so as to instruct the storage system 120 to generate a portion, corresponding to the block, of a new copy of the data object 112 based on data in a block in the copy 122, which corresponds to the block.

At block 840, data in the block may be sent to the storage system 120. Subsequently, at block 850, the storage system 120 may be instructed to generate a portion, corresponding to the block, in a new copy based on received data. At block 860, it may be determined whether there is a further block which is not processed. If yes, the method returns to block 810 so as to process the further block. If not, the method 800 ends.

At block 810, if a block is outside the difference area 210, the method 800 proceeds to block 870, at which point it may be determined based on an abstract in the cache 116 whether data in the block is changed or not. At block 870, if the cache 116 is missed, the method 800 proceeds to block 820 so as to send a query request to the storage system 120. If there is a cache 116 hit (i.e. the cache 116 has an abstract of a block in the copy 122, which corresponds to the block), the method 800 proceeds to block 880. At block 880, it may be determined whether data in the block matches an abstract in the cache 116. If yes, this means data in the block is not changed, and the method 800 proceeds to block 890 so as to instruct the storage system 120 to generate a portion, corresponding to the block, of a new copy of the data object 112 based on data in a block in the copy 122, which corresponds to the block. In other words, the portion in the copy for the block remains unchanged. Subsequently, the method proceeds to block 860 so as to judge whether there is a further block which is not processed.

With the above example implementations, if it is determined a block is within the difference area 210, at this point there is a high probability that data in the block is changed. Therefore, a query may be made to the storage system 120 directly to see whether data in the block is changed. In this way, the process of querying the cache 116 may be omitted, and further the processing flow is simplified. If it is determined a block is outside the difference area 210, at this point there is a low probability that data in the block is changed. Therefore, a query may be made to the cache 116 directly to see whether data in the block is changed. In this way, it is possible to take advantage of fast access to the cache 116 and further increase the processing speed.

While examples of the method according to the present disclosure have been described in detail with reference to FIGS. 2 to 8, description is presented below to the implementation of a corresponding apparatus. According to example implementations of the present disclosure, provided is an apparatus for managing a backup job, the backup job being used to store a data object to a storage system. The apparatus comprises: a difference determining module configured to determine the difference between the data object specified by the backup job and a copy of the data object in the storage system; an area determining module configured to, in response to determining the difference meets a predetermined threshold, determine a difference area in the data object where there might exist the difference; a first processing module configured to, with respect to a first block within the difference area, in a group of blocks in the data object, process the backup job based on a first query result from the storage system, the first query result indicating whether data in the first block differs from data in a corresponding block in the copy.

According to example implementations of the present disclosure, the area determining module is further configured to determine the difference area based on a mapping relation between a copy of the data object and a changed area in the data object as included in a difference mapping of the storage system.

According to example implementations of the present disclosure, there is further comprised a mapping obtaining module configured to obtain the difference mapping. The mapping obtaining module is configured to: obtain a plurality of historical copies of the data object respectively; determine information of a changed portion in the plurality of historical copies respectively; and train the difference mapping based on the plurality of historical copies and the information, so that the trained difference mapping represents a mapping relation between a historical copy and a changed portion in a historical copy.

According to example implementations of the present disclosure, information of a changed portion in the plurality of historical copies comprises at least one of: with respect to a given historical copy among the plurality of historical copies, an address of a changed block in the given historical copy; the number of times that a changed block in the given historical copy has been changed; the number of times that a changed block in the given historical copy has been changed successively; and time distribution of a changed block in the given historical copy.

According to example implementations of the present disclosure, there are further comprised: a requesting module configured to send a query request to the storage system so as to query whether data in the first block differs from data in a corresponding block in the copy; and a receiving module configured to receive from the storage system the first query result which is returned for the first query request.

According to example implementations of the present disclosure, the first processing module is further configured to: send the data in the first block to the storage system in response to the first query result indicating difference; and instruct the storage system to generate a portion, corresponding to the first block, of a new copy of the data object based on received data.

According to example implementations of the present disclosure, the first processing module is further configured to: instruct the storage system to generate a portion, corresponding to the first block, of a new copy of the data object based on a portion in the copy which corresponds to the first block in response to the first query result indicating no difference.

According to example implementations of the present disclosure, the device is implemented at a client for accessing the storage system. According to example implementations of the present disclosure, the device further comprises a second processing module. The second processing module is configured to: with respect to a second block in the group of blocks which is outside the difference area, process the backup job based on a second query result from a cache at the client, wherein the second query result indicates whether data in the second block differs from data in a corresponding block in the copy.

According to example implementations of the present disclosure, the second processing module is further configured to: load to the cache an abstract of at least one portion of blocks in a group of blocks in the copy, the group of blocks in the copy corresponding to a group of blocks in the data object; set the second query result as there being no difference in response to determining an abstract of data in the second block matches an abstract in the cache; and set the second query result as there being difference in response to determining an abstract in the second block does not match an abstract in the cache.

According to example implementations of the present disclosure, the second processing module is further configured to: in response to determining in the cache there exists no abstract of a block in the copy which corresponds to the second block, send a second query request to the storage system so as to query whether data in the second block differs from data in a corresponding block in the copy.

Figure 9:
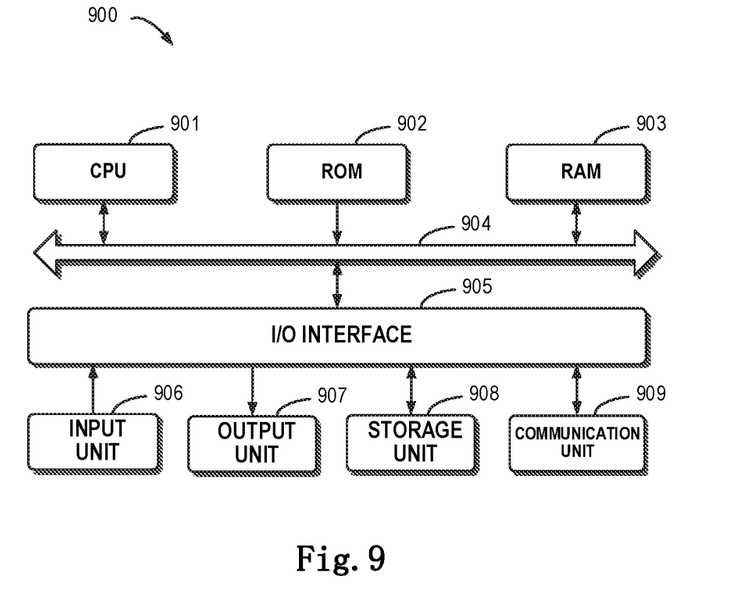
FIG. 9 schematically illustrates a block diagram of a device for managing a backup job according to example implementations of the present disclosure.

FIG. 9 schematically shows a block diagram of a device 900 for managing a storage system according to example implementations of the present disclosure. As depicted, the device 900 includes a central process unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the apparatus 900. CPU 901, ROM 902 and RAM 903 are connected to each other via a bus 904. The input/output (I/O) interface 905 is also connected to the bus 804.

A plurality of components in the device 900 is connected to the I/O interface 905, including: an input unit 906, such as keyboard, mouse and the like; an output unit 907, e.g., various kinds of display and loudspeakers etc.; a storage unit 908, such as magnetic disk and optical disk etc.; and a communication unit 909, such as network card, modem, wireless transceiver and the like. The communication unit 909 allows the device 900 to exchange information/data with other devices via the computer network, such as Internet, and/or various telecommunication networks.

The above described each process and treatment, such as the methods 300 and 800 can also be executed by the processing unit 901. For example, in some implementations, the methods 300 and 800 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described methods 300 and 800 can be implemented. Alternatively, in other implementations, the CPU 901 also can be configured in other suitable manners to realize the above procedure/method.

According to example implementations of the present disclosure, there is provided a device for managing a backup job, the backup job being used to store a data object to a storage system. The device comprises: at least one processor; a volatile memory; and a memory coupled to the at least one processor, the memory having instructions stored thereon, the instructions, when executed by the at least one processor, causing the apparatus to perform acts. The acts include: determining the difference between the data object specified by the backup job and a copy of the data object in the storage system; in response to determining the difference meets a predetermined threshold, determining a difference area in the data object where there might exist the difference; with respect to a first block within the difference area, in a group of blocks in the data object, processing the backup job based on a first query result from the storage system, the first query result indicating whether data in the first block differs from data in a corresponding block in the copy.

According to example implementations of the present disclosure, determining a difference area in the data object where there might exist the difference comprises: determining the difference area based on a mapping relation between a copy of the data object and a changed area in the data object as included in a difference mapping of the storage system.

According to example implementations of the present disclosure, the acts further comprise: obtaining the difference mapping, comprising: obtaining a plurality of historical copies of the data object respectively; determining information of a changed portion in the plurality of historical copies respectively; and training the difference mapping based on the plurality of historical copies and the information, so that the trained difference mapping represents a mapping relation between a historical copy and a changed portion in a historical copy.

According to example implementations of the present disclosure, information of a changed portion in the plurality of historical copies comprises at least one of: with respect to a given historical copy among the plurality of historical copies, an address of a changed block in the given historical copy; the number of times that a changed block in the given historical copy has been changed; the number of times that a changed block in the given historical copy has been changed successively; and time distribution of a changed block in the given historical copy.

According to example implementations of the present disclosure, the acts further comprise: sending a query request to the storage system so as to query whether data in the first block differs from data in a corresponding block in the copy; and receiving from the storage system the first query result which is returned for the first query request.

According to example implementations of the present disclosure, processing the backup job based on the first query result of the storage system comprises: sending the data in the first block to the storage system in response to the first query result indicating difference; and instructing the storage system to generate a portion, corresponding to the first block, of a new copy of the data object based on received data.

According to example implementations of the present disclosure, processing the backup job based on the first query result of the storage system comprises: instructing the storage system to generate a portion, corresponding to the first block, of a new copy of the data object based on a portion in the copy which corresponds to the first block in response to the first query result indicating no difference.

According to example implementations of the present disclosure, the device is implemented at a client for accessing the storage system, and the acts further comprise: with respect to a second block in the group of blocks which is outside the difference area, processing the backup job based on a second query result from a cache at the client, wherein the second query result indicates whether data in the second block differs from data in a corresponding block in the copy.

According to example implementations of the present disclosure, the acts further comprise: loading to the cache an abstract of at least one portion of blocks in a group of blocks in the copy, the group of blocks in the copy corresponding to a group of blocks in the data object; setting the second query result as there being no difference in response to determining an abstract of data in the second block matches an abstract in the cache; and setting the second query result as there being difference in response to determining an abstract in the second block does not match an abstract in the cache.

According to example implementations of the present disclosure, the acts further comprise: in response to determining in the cache there exists no abstract of a block in the copy which corresponds to the second block, sending a second query request to the storage system so as to query whether data in the second block differs from data in a corresponding block in the copy.

According to example implementations of the present disclosure, there is provided a computer program product. The computer program product is tangibly stored on a non-transient computer readable medium and comprises machine executable instructions which are used to implement the method according to the present disclosure.

According to example implementations of the present disclosure, there is provided a computer readable medium. The computer readable medium has machine executable instructions stored thereon, the machine executable instructions, when executed by at least one processor, causing the at least one processor to implement the method according to the present disclosure.

The present disclosure can be method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but not limited to, such as electrical storage device, magnetic storage device, optical storage device, electromagnetic storage device, semiconductor storage device or any appropriate combinations of the above. More concrete examples of the computer-readable storage medium (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combinations of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where remote computer is involved, the remote computer can be connected to the user computer via any type of networks, including local area network (LAN) and wide area network (WAN), or to the external computer (e.g., connected via Internet using the Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow chart and/or block diagram of method, apparatus (system) and computer program products according to implementations of the present disclosure. It should be understood that each block of the flow chart and/or block diagram and the combination of various blocks in the flow chart and/or block diagram can be implemented by computer-readable program instructions.

The computer-readable program instructions can be provided to the processing unit of general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular manner, such that the computer-readable medium stored with instructions contains an article of manufacture, including instructions for implementing various aspects of the functions/actions stipulated in one or more blocks of the flow chart and/or block diagram.

The computer-readable program instructions can also be loaded into computer, other programmable data processing apparatuses or other devices, so as to execute a series of operation steps on the computer, other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable other ordinary skilled in the art to understand implementations of the present disclosure.

We claim:

1. A method for managing a backup job, the method comprising:
   determining a difference between a data object specified by the backup job and a copy of the data object in a storage system;
   in response to determining that the difference meets a predetermined threshold, determining a difference area in the data object based on a mapping relation between the copy of the data object and a changed area in the data object using a difference mapping of the storage system, wherein the difference area comprises a group of blocks; and
   processing the backup job based on a first query result from the storage system, where the first query result indicating whether data in a first block in the difference area differs from data in a corresponding block in the copy.

2. The method of claim 1, further comprising: obtaining the difference mapping, comprising:
   obtaining a plurality of historical copies of the data object respectively;
   determining information of a changed portion in the plurality of historical copies respectively; and
   generating the difference mapping based on the plurality of historical copies and the information, wherein the difference mapping represents a mapping relation between a historical copy and a changed portion in the historical copy.

3. The method of claim 2, wherein the information of the changed portion in the plurality of historical copies comprises at least one of:
   an address of a changed block in a given historical copy;
   a number of times that a changed block in the given historical copy has been changed;
   a number of times that a changed block in the given historical copy has been changed successively; and
   a time distribution of a changed block in the given historical copy.

4. The method of claim 1, further comprising:
   sending a query request to the storage system to determine whether data in the first block differs from data in the corresponding block in the copy; and
   receiving from the storage system the first query result which is returned for the query request.

5. The method of claim 1, wherein processing the backup job based on the first query result of the storage system comprises:
   sending the data in the first block to the storage system in response to the first query result indicating that there is a difference; and
   instructing the storage system to generate a portion, corresponding to the first block, of a new copy of the data object based.

6. The method of claim 1, wherein processing the backup job based on the first query result of the storage system comprises:
   in response to the first query result indicating that there is no difference, instructing the storage system to generate a portion, corresponding to the first block, of a new copy of the data object based on a portion in the copy which corresponds to the first block.

7. The method of claim 1, wherein the method is implemented at a client for accessing the storage system, and the method further comprises:
   with respect to a second block in the group of blocks which is outside the difference area, processing the backup job based on a second query result from a cache at the client, wherein the second query result indicates whether data in the second block differs from data in a corresponding second block in the copy.

8. The method of claim 7, further comprising:
   loading to the cache an abstract of at least one portion of blocks in a group of blocks in the copy, the group of blocks in the copy corresponding to a group of blocks in the data object;
   setting the second query result as there being no difference in response to determining an abstract of data in the second block matches an abstract in the cache; and
   setting the second query result as there being difference in response to determining an abstract in the second block does not match an abstract in the cache.

9. The method of claim 8, further comprising:
   in response to determining in the cache there exists no abstract which corresponds to the second block, sending a second query request to the storage system so as to query whether data in the second block differs from data in the corresponding second block in the copy.

10. A device for managing a backup job, the device comprising:
    at least one processor;
    a volatile memory; and
    a memory coupled to the at least one processor and having instructions stored thereon, the instructions, when executed by the at least one processor, causing the device to perform a method, the method comprising:
      determining a difference between a data object specified by the backup job and a copy of the data object in a storage system;
      in response to determining that the difference meets a predetermined threshold, determining a difference area in the data object based on a mapping relation between the copy of the data object and a changed area in the data object using a difference mapping of the storage system, wherein the difference area comprises a group of blocks; and
      processing the backup job based on a first query result from the storage system, where the first query result indicating whether data in a first block in the difference area differs from data in a corresponding block in the copy.

11. The device of claim 10, wherein the method further comprises:
    obtaining the difference mapping, comprising:
      obtaining a plurality of historical copies of the data object respectively;
      determining information of a changed portion in the plurality of historical copies respectively; and
      generating the difference mapping based on the plurality of historical copies and the information, wherein the difference mapping represents a mapping relation between a historical copy and a changed portion in the historical copy.

12. The device of claim 11, wherein information of a changed portion in the plurality of historical copies comprises at least one of
    an address of a changed block in a given historical copy;
    a number of times that a changed block in the given historical copy has been changed;
    a number of times that a changed block in the given historical copy has been changed successively; and
    a time distribution of a changed block in the given historical copy.

13. The device of claim 10, wherein the method further comprises:
sending a query request to the storage system to determine whether data in the first block differs from data in the corresponding block in the copy; and
receiving from the storage system the first query result which is returned for the query request.

14. The device of claim 10, wherein processing the backup job based on the first query result of the storage system comprises:
sending the data in the first block to the storage system in response to the first query result indicating that there is a difference; and
instructing the storage system to generate a portion, corresponding to the first block, of a new copy of the data object based.

15. The device of claim 10, wherein processing the backup job based on the first query result of the storage system comprises:
in response to the first query result indicating that there is no difference, instructing the storage system to generate a portion, corresponding to the first block, of a new copy of the data object based on a portion in the copy which corresponds to the first block.

16. The device of claim 10, wherein the device is implemented at a client for accessing the storage system, and method further comprises:
with respect to a second block in the group of blocks which is outside the difference area, processing the backup job based on a second query result from a cache at the client, wherein the second query result indicates whether data in the second block differs from data in a corresponding second block in the copy.

17. The device of claim 16, wherein method further comprises:
loading to the cache an abstract of at least one portion of blocks in a group of blocks in the copy, the group of blocks in the copy corresponding to a group of blocks in the data object;
setting the second query result as there being no difference in response to determining an abstract of data in the second block matches an abstract in the cache; and
setting the second query result as there being difference in response to determining an abstract in the second block does not match an abstract in the cache.

18. A computer program product, tangibly stored on a non-transient computer readable medium and comprising machine executable instructions which are used to implement a method, the method comprising:
determining a difference between a data object specified by a backup job and a copy of the data object in a storage system;
in response to determining that the difference meets a predetermined threshold, determining a difference area in the data object based on a mapping relation between the copy of the data object and a changed area in the data object using a difference mapping of the storage system, wherein the difference area comprises a group of blocks; and
processing the backup job based on a first query result from the storage system, where the first query result indicating whether data in a first block in the difference area differs from data in a corresponding block in the copy.

* * * * *